United States Patent
Wang et al.

(10) Patent No.: US 9,371,441 B2
(45) Date of Patent: Jun. 21, 2016

(54) POLYETHYLENE BLEND-COMPOSITION SUITABLE FOR BLOWN FILMS, AND FILMS MADE THEREFROM

(71) Applicant: Dow Global Technologies LLC, Midland, MI (US)

(72) Inventors: Jian Wang, Rosharon, TX (US); Nilesh R. Savargaonkar, Pearland, TX (US); Mehmet Demirors, Pearland, TX (US); John W. Garnett, IV, Omaha, NE (US); Ayush A. Bafna, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 18 days.

(21) Appl. No.: 14/388,644

(22) PCT Filed: May 22, 2013

(86) PCT No.: PCT/US2013/042139
§ 371 (c)(1),
(2) Date: Sep. 26, 2014

(87) PCT Pub. No.: WO2014/003925
PCT Pub. Date: Jan. 3, 2014

(65) Prior Publication Data
US 2015/0291783 A1 Oct. 15, 2015

Related U.S. Application Data

(60) Provisional application No. 61/664,301, filed on Jun. 26, 2012.

(51) Int. Cl.
| | |
|---|---|
| *C08L 23/06* | (2006.01) |
| *B29C 47/00* | (2006.01) |
| *C08J 5/18* | (2006.01) |
| *C08L 23/08* | (2006.01) |
| *B29C 47/88* | (2006.01) |
| *B29C 47/92* | (2006.01) |
| *B32B 27/08* | (2006.01) |
| *B32B 27/20* | (2006.01) |
| *B32B 27/32* | (2006.01) |
| *B32B 1/02* | (2006.01) |
| *B65D 25/14* | (2006.01) |

(52) U.S. Cl.
CPC ............. *C08L 23/06* (2013.01); *B29C 47/0026* (2013.01); *B29C 47/8825* (2013.01); *B29C 47/92* (2013.01); *B32B 1/02* (2013.01); *B32B 27/08* (2013.01); *B32B 27/20* (2013.01); *B32B 27/32* (2013.01); *B65D 25/14* (2013.01); *C08J 5/18* (2013.01); *C08L 23/0815* (2013.01); *B29C 2947/92704* (2013.01); *B29C 2947/92714* (2013.01); *B32B 2250/242* (2013.01); *B32B 2270/00* (2013.01); *B32B 2307/4026* (2013.01); *B32B 2307/518* (2013.01); *B32B 2439/00* (2013.01); *C08J 2323/08* (2013.01); *C08J 2423/06* (2013.01); *C08J 2423/08* (2013.01); *C08L 2203/16* (2013.01); *C08L 2205/025* (2013.01); *C08L 2205/03* (2013.01)

(58) Field of Classification Search
CPC B29C 47/0026; B29C 47/8825; B29C 47/92; B29C 2947/92704; C08L 23/0815; C08L 23/06; C08L 2203/16; C08L 2205/025; B65D 25/14; B32B 27/08; B32B 27/20; B32B 27/32; B32B 1/02; B32B 2307/518; B32B 2307/4028; B32B 2270/00; C08J 2323/08; C08J 2423/06; C08J 2423/08
See application file for complete search history.

(56) References Cited

U.S. PATENT DOCUMENTS

2009/0317614 A1* 12/2009 Nilsen et al. ............ B32B 27/32
428/219

FOREIGN PATENT DOCUMENTS

| CA | 2479738 | 3/2005 | | |
|---|---|---|---|---|
| WO | WO 2007129078 A1 * | 11/2007 | ............... | B32B 27/32 |

OTHER PUBLICATIONS

PCT International Search Report and Written Opinion dated Jul. 19, 2013 for PCT/US2013/042139, 6 pages.
PCT International Preliminary Report on Patentability dated Jan. 8, 2015 for PCT/US2013/042139, 5 pages.

(Continued)

*Primary Examiner* — Nathan M Nutter

(57) ABSTRACT

The instant invention provides a polyethylene blend-composition suitable for blown films, and films made therefrom. The polyethylene blend-composition suitable for blown films according to the present invention comprises the melt blending product of: (a) from 0.5 to 6 percent by weight of a bimodal linear low density polyethylene having a density in the range of from 0.935 to 0.970 g/cm$^3$, and a melt index ($I_2$) in the range of from 0.3 to 5 g/10 minutes; (b) 90 percent or greater by weight of a monomodal linear low density polyethylene having a density in the range of from 0.910 to 0.950 g/cm3, and a melt index ($I_2$) in the range of from 0.1 to less than or equal to 5 g/10 minutes; (c) optionally from 0.5 to 4 percent by weight of a low density polyethylene having a density in the range of from 0.915 to 0.935 g/cm3, and a melt index ($I_2$) in the range of from greater than 0.8 to less than or equal to 5 g/10 minutes, and a molecular weight distribution ($M_w/M_n$) in the range of from 6 to 10; (d) optionally a hydrotalcite based neutralizing agent; (e) optionally one or more nucleating agents; and (f) optionally one or more antioxidants.

6 Claims, 1 Drawing Sheet

(56) References Cited

OTHER PUBLICATIONS

EPO Communication pursuant to Rules 161(1) and 162 EPC dated Feb. 3, 2015 for European Application No. 13726979.1, 2 pages.

Response to EPO Communication pursuant to Rules 161(1) and 162 EPC dated Jul. 22, 2015 for European Application No. 13726979.1, 30 pages.

Chinese Office Action dated Mar. 1, 2016; from Chinese counterpart Application No. 201380042916.7.

* cited by examiner

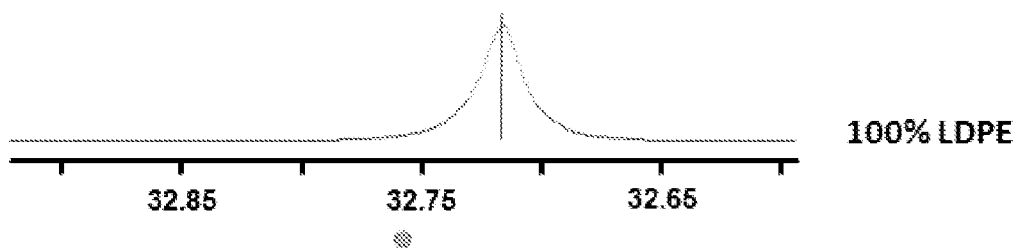

POLYETHYLENE BLEND-COMPOSITION SUITABLE FOR BLOWN FILMS, AND FILMS MADE THEREFROM

REFERENCE TO RELATED APPLICATIONS

The present application claims the benefit of U.S. Provisional Application No. 61/664,301, filed on Jun. 26, 2012.

FIELD OF INVENTION

The instant invention relates to a polyethylene blend-composition suitable for blown films, and films made therefrom.

BACKGROUND OF THE INVENTION

The use of polymeric materials such as ethylene-based compositions in an extrusion blown film process is well-known. The extrusion blown film process employs an extruder which heats, melts, and conveys the molten polymeric material and forces it through an annular die. The ethylene-based film is drawn from the die and formed into a tubular shape and eventually passed through a pair of draw or nip rollers. Internal compressed air is then introduced from the mandrel causing the tube to increase in diameter forming a bubble of the desired size. Thus, the blown film is stretched in two directions, namely in the axial direction, i.e. by the use of forced air which expands the diameter of the bubble, and in the lengthwise direction of the bubble, i.e. by the action of a winding element which pulls the bubble through the machinery. External air is also introduced around the bubble circumference to cool the melt as it exits the die. The film width is varied by introducing more or less internal air into the bubble thus increasing or decreasing the bubble size. The film thickness is controlled primarily by increasing or decreasing the speed of the draw roll or nip roll to control the draw-down rate.

The bubble is then collapsed into two doubled layers of film immediately after passing through the draw or nip roll. The cooled film can then be processed further by cutting or sealing to produce a variety of consumer products.

Despite the research efforts in producing the polymeric materials suitable for blown films, there is still a need for a polyethylene blend composition suitable for blown film, providing improved output rates. Furthermore, there is still a need for a method of producing a polyethylene blend composition suitable for blown film, providing improved output rates.

SUMMARY OF THE INVENTION

The instant invention provides a polyethylene blend-composition suitable for blown films, and films made therefrom.

In one embodiment, the instant invention provides a polyethylene blend-composition suitable for blown films comprising the melt blending product of: (a) from 0.5 to 6 percent by weight of a bimodal linear low density polyethylene having a density in the range of from 0.935 to 0.970 g/cm$^3$, and a melt index ($I_2$) in the range of from 0.3 to 5 g/10 minutes; (b) 90 percent or greater by weight of a monomodal linear low density polyethylene having a density in the range of from 0.910 to 0.950 g/cm$^3$, and a melt index ($I_2$) in the range of from 0.1 to less than or equal to 5 g/10 minutes; (c) optionally from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (d) optionally a hydrotalcite based neutralizing agent; (e) optionally one or more nucleating agents; and (f) optionally one or more antioxidants.

In an alternative embodiment, the instant invention provides a blown film comprising the polyethylene blend-composition, as described above.

In an alternative embodiment, the instant invention further provides an article comprising one or more blown films comprising the polyethylene blend-composition, as described above.

In another alternative embodiment, the instant invention further provides a container device comprising: (a) one or more substrates; and (b) one or more layers comprising one or more blown films comprising the polyethylene blend-composition, as described above.

In an alternative embodiment, the instant invention provides a polyethylene blend-composition suitable for blown films, a blown film, an article and/or a container device, in accordance with any of the preceding embodiments, except that when said polyethylene blend-composition is formed into a film via blown film process, the output rate is improved at least 5 percent relative to a similar linear low density polyethylene.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 reports the $^{13}$C NMR spectrum between 32.6 and 32.9 ppm for a low density polyethylene.

DETAILED DESCRIPTION OF THE INVENTION

The instant invention provides a polyethylene blend-composition suitable for blown film applications, and films made therefrom. The term "polyethylene blend-composition," as used herein, refers to a physical blend of at least a bimodal linear low density polyethylene and a monomodal linear low density polyethylene, and optionally a low density polyethylene, as described herein.

The polyethylene blend-composition suitable for blown film according to the presence invention comprises the melt blending product of: (a) from 0.5 to 6 percent by weight of a bimodal linear low density polyethylene having a density in the range of from 0.935 to 0.970 g/cm$^3$, and a melt index ($I_2$) in the range of from 0.3 to 5 g/10 minutes; (b) 90 percent or greater by weight of a monomodal linear low density polyethylene having a density in the range of from 0.910 to 0.950 g/cm$^3$, and a melt index ($I_2$) in the range of from 0.1 to less than or equal to 5 g/10 minutes; (c) optionally from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10; (d) optionally a hydrotalcite based neutralizing agent; (e) optionally one or more nucleating agents; and (f) optionally one or more antioxidants.

The polyethylene blend-composition has a density in the range of 0.910 to 0.955 g/cm$^3$. All individual values and subranges from 0.910 to 0.955 g/cm$^3$ are included herein and disclosed herein; for example, the density can be from a lower limit of 0.910, 0915 g/cm$^3$ to an upper limit of 0.925, 0.930, 0.940, 0.945, or 0.955 g/cm$^3$. For example, the polyethylene blend-composition may have a density in the range of from 0.917 to 0.935 g/cm$^3$; or in the alternative, from 0.918 to 0.925 g/cm$^3$; or in the alternative, from 0.919 to 0.923 g/cm$^3$.

The polyethylene blend-composition has a melt index ($I_2$) in the range of from 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes, to an upper limit of 1, 2, 3, 4, or 5 g/10 minutes. For example, the polyethylene blend composition may have a melt index ($I_2$) in the range of from 0.2 to 5 g/10 minutes; or in the alternative, from 0.2 to 3 g/10 minutes; or in the alternative, from 0.5 to 2 g/10 minutes.

The inventive polyethylene blend-compositions can provide higher melt strength, better bubble stability and higher output rate as well as improved optical properties.

In another embodiment, when said polyethylene blend-composition is formed into a film via blown film process, the output rate is improved at least 5 percent, for example from 5 to 20 percent, relative to a similar monomodal linear low density polyethylene.

Bimodal Linear Low Density Polyethylene (BLLDPE) Component

The polyethylene blend-composition suitable for blown film according to the presence invention comprises from 0.5 to 6 percent by weight of a bimodal linear low density polyethylene (BLLDPE). The bimodal linear low density polyethylene has 2 peaks on a GPC curve determined by gel permeation chromatography. The bimodal linear low density polyethylene comprises (a) less than or equal to 100 percent, for example, at least 80 percent, or at least 90 percent, or at least 95 percent by weight of the units derived from ethylene; and (b) less than 20 percent, or less than 10 percent, or less than 5 percent by weight of units derived from one or more α-olefin comonomers other than ethylene.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The bimodal linear low density polyethylene has a density in the range of from 0.935 to 0.970 g/cm$^3$. For example, the density can be from a lower limit of 0.935, 0.940, or 0.950 g/cm$^3$ to an upper limit of 0.965, 0.968, or 0.970 g/cm$^3$.

The bimodal linear low density polyethylene has a molecular weight distribution ($M_w/M_n$) in the range of from 2 to 20. For example, the molecular weight distribution ($M_w/M_n$) can be from a lower limit of 2, 3, or 4 to an upper limit of 10, 15, or 20.

The bimodal linear low density polyethylene has a melt index ($I_2$) in the range of 0.3 to 5 g/10 minutes, for example, in the range of from 0.5 to 2.

Any conventional ethylene (co)polymerization reaction processes may be employed to produce the bimodal linear low density polyethylene. Such conventional ethylene (co) polymerization reaction processes include, but are not limited to, gas phase polymerization process, slurry phase polymerization process, solution phase polymerization process, and combinations thereof in the presence of one or more catalyst systems including, but not limited to Ziegler-Natta catalyst systems, metallocene catalyst systems, and/or post-metallocene catalyst systems, using at least two conventional reactors, e.g. fluidized bed gas phase reactors, loop reactors, stirred tank reactors, batch reactors in parallel, series, and/or any combinations thereof. In one embodiment, the bimodal linear low density polyethylene prepared in a dual reactor configuration connected in series has a high molecular weight component prepared in one reactor and a low molecular weight prepared in the other reactor, wherein the melt index ($I_2$) of the high molecular weight component is in the range of from less than 0.3 g/10 minutes, e.g. 0.01 to 0.3 g/10 minutes.

Such bimodal linear low density polyethylenes are commercially available under the tradename ELITE™ from The Dow Chemical Company.

Monomodal Linear Low Density Polyethylene (LLDPE) Component

The polyethylene blend-composition suitable for blown film according to the present invention comprises 90 percent or greater by weight of a monomodal linear low density polyethylene (MLLDPE); for example, from 90 to 99 weight percent; or in the alternative from 95 to 99 weight percent; or in the alternative from 97 to 99 weight percent. The monomodal linear low density polyethylene has only 1 peak on a GPC curve determined by gel permeation chromatography.

The MLLDPE has a density in the range of from 0.910 to 0.950 g/cm$^3$. All individual values and subranges from 0.910 to 0.950 g/cm$^3$ are included herein and disclosed herein; for example, the density can be from a lower limit of 0.910, 0.915, 0.917, 0.918, or 0.919 g/cm$^3$ to an upper limit of 0.930, 0.941, 0.947, or 0.950 g/cm$^3$. For example, the MLLDPE may have a density in the range of from 0.915 to 0.950 g/cm$^3$; or in the alternative, from 0.917 to 0.950 g/cm$^3$; or in the alternative, from 0.918 to 0.925 g/cm$^3$; or in the alternative, from 0.918 to 0.922 g/cm$^3$; or in the alternative, from 0.919 to 0.921 g/cm$^3$.

The MLLDPE has a molecular weight distribution ($M_w/M_n$) in the range of from 2 to 5, for example, from 3.5 to 5.

The MLLDPE has a melt index ($I_2$) in the range of from 0.1 to 5 g/10 minutes. All individual values and subranges from 0.1 to 5 g/10 minutes are included herein and disclosed herein; for example, the melt index ($I_2$) can be from a lower limit of 0.1, 0.2, 0.5, or 0.8 g/10 minutes, to an upper limit of 1, 2, 3, 4, or 5 g/10 minutes. For example, the MLLDPE may have a melt index ($I_2$) in the range of from 0.2 to 5 g/10 minutes; or in the alternative, from 0.2 to 3 g/10 minutes; or in the alternative, from 0.5 to 2 g/10 minutes.

The MLLDPE may have a melt flow ratio ($I_{10}/I_2$) in the range of from 6 to 10. All individual values and subranges from 6 to 10 are included herein and disclosed herein. For example, the MLLDPE may have a melt flow ratio ($I_{10}/I_2$) in the range of from 7 to 10; or in the alternative, from 7 to 9.

In one embodiment, the MLLDPE may have 2 or more peaks on the Differential Scanning Calorimetry (DSC) heating curve, measured according to the Differential Scanning Calorimetry (DSC) method.

The MLLDPE may comprise less than 35 percent by weight of units derived from one or more α-olefin comonomers. All individual values and subranges from less than 35 weight percent are included herein and disclosed herein; for example, the MLLDPE may comprise less than 25 percent by weight of units derived from one or more α-olefin comonomers; or in the alternative, less than 20 percent by weight of units derived from one or more α-olefin comonomers; or in the alternative, less than 15 percent by weight of units derived from one or more α-olefin comonomers; or in the alternative, less than 10 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The MLLDPE may comprise at least 65 percent by weight of units derived from ethylene. All individual values and subranges from at least 65 weight percent are included herein and disclosed herein; for example, the MLLDPE may comprise at least 75 percent by weight of units derived from ethylene; or in the alternative, at least 85 percent by weight of units derived from ethylene; or in the alternative, at least 90 percent by weight of units derived from ethylene.

The MLLDPE may further be compounded with one or more additional components such as other polymers and/or additives. Such additives include, but are not limited to, one or more hydrotalcite based neutralizing agents, one or more nucleating agents, antistatic agents, color enhancers, dyes, lubricants, fillers, pigments, primary antioxidants, secondary antioxidants, processing aids, UV stabilizers, nucleating agents, and/or combinations thereof. The MLLDPE may contain any amounts of additives. The MLLDPE may comprise from about 0 to about 10 percent by the combined weight of such additives, based on the combined weight of MLLDPE and such additives.

Any conventional ethylene (co)polymerization reaction may be employed to produce the MLLDPE. Such conventional ethylene (co)polymerization reactions include, but are not limited to, gas phase polymerization process, slurry phase polymerization process, solution phase polymerization process, and combinations thereof in the presence of one or more catalyst systems including, but not limited to Ziegler-Natta catalyst systems, metallocene catalyst systems, and/or post-metallocene catalyst systems, using one or more conventional reactors, e.g. fluidized bed gas phase reactors, loop reactors, stirred tank reactors, batch reactors in parallel, series, and/or any combinations thereof.

Such MLLDPE are commercially available under the tradename DOWLEX™ from The Dow Chemical Company.

Low Density Polyethylene (LDPE) Component

The polyethylene blend composition suitable for blown film according to the present invention comprises less than or equal to 4 percent by weight of a low density polyethylene (LDPE); for example, from 0.5 to 4 weight percent; or in the alternative, from 0.5 to 3 weight percent; or in the alternative, from 1 to 3.5 weight percent. The low density polyethylene has a density in the range of from 0.915 to 0.935 g/cm³; for example, from 0.915 to 0.925 g/cm³; or in the alternative, from 0.918 to 0.922 g/cm³. The low density polyethylene has a melt index ($I_2$) in the range of from greater than 0.8 to less than or equal to 5 g/10 minutes; for example, from 1 to 3 g/10 minutes; or in the alternative, from 1.5 to 2.5 g/10 minutes. The low density polyethylene has a molecular weight distribution ($M_w/M_n$) in the range of from 6 to 10; for example, from 6 to 9.5; or in the alternative, from 6 to 9; or in the alternative, from 6 to 8.5; or in the alternative, from 7.5 to 9. Such low density polyethylene compositions are commercially available, for example, from The Dow Chemical Company.

LDPE has a long chain branching of at least 2 per 1000 carbon and/or up to 4 per 1000 carbon.

LDPE has a long chin branching of at least 2 per 1000 carbon and/or up to 4 per 1000 carbon.

Such LDPE are commercially available from The Dow Chemical Company.

Additives

The polyethylene blend-composition may further comprise one or more additional additives. Such additives include, but are not limited to, one or more hydrotalcite based neutralizing agents, one or more nucleating agents, one or more antistatic agents, one or more color enhancers, one or more dyes, one or more lubricants, one or more fillers, one or more pigments, one or more primary antioxidants, one or more secondary antioxidants, one or more processing aids, one or more UV stabilizers, and/or combinations thereof. The polyethylene blend-composition may comprise any amounts of such additives. The polyethylene blend-composition may comprise from about 0 to about 10 percent by the combined weight of such additives, based on the total weight of the polyethylene blend composition.

Production

The polyethylene blend-composition is prepared via any conventional melt blending process such as extrusion via an extruder, e.g. single or twin screw extruder. The BLLDPE, MLLDPE, optionally LDPE, and optionally one or more additives may be melt blended in any order via one or more extruders to form a uniform polyethylene blend-composition.

Applications

The polyethylene blend-composition may be formed into a film via, for example, a blown film process. In one embodiment, when the polyethylene blend-composition is formed into a film via a blown film process, the output rate is improved at least 5 percent relative to a similar monomodal linear low density polyethylene. In one embodiment, the polyethylene blend-composition may be formed into a multilayer blown film structure. In another embodiment, the polyethylene blend-composition may be formed into a single layer or a multi-layer blown film structure associated with one or more substrates. The blown films prepared according to the present invention may be used as lamination films where the blown polyethylene film is adhesively laminated to a substrate such as biaxially oriented polypropylene (BOPP) films or biaxially oriented polyethylene terephthalate (BOPET) films, liner films, sealant webs, shrink films, stretch films, etc. The blown films according to the present invention have a thickness in the range of from 0.3 to 5 mils, for example, 0.5 to 5 mils.

EXAMPLES

The following examples illustrate the present invention but are not intended to limit the scope of the invention. The examples of the instant invention demonstrate that when the polyethylene blend-composition is formed into a film via a blown film process, the output rate is improved at least 5 percent relative to a similar monomodal linear low density polyethylene.

Polyethylene Blend-Composition Components:

BLLDPE is a bimodal linear low density polyethylene, prepared via solution polymerization process in a dual reactor configuration connected in series, having a melt index ($I_2$) of approximately 0.83 g/10 minutes and a density of approximately 0.961 g/cm³, which is commercially available under the tradename ELITE™ 5960G from The Dow Chemical Company. The properties of the BLLDPE are measured, and reported in Table 1.

MLLDPE is a linear low density polyethylene, prepared via solution polymerization process in a single reactor in the presence of a Ziegler-Natta based catalyst system, having a melt index ($I_2$) of approximately 0.96 g/10 minutes and a density of approximately 0.920 g/cm³, which is commercially available under the tradename DOWLEX 2045G from The Dow Chemical Company. The properties of the MLLDPE are measured, and reported in Table 1.

LDPE is a low density polyethylene, prepared via high pressure polymerization process, having a melt index ($I_2$) of approximately 1.85 g/10 minutes, and a density of 0.919 g/cm³, provided by The Dow Chemical Company.

Inventive Composition 1

Inventive Composition 1 is a polyethylene blend-composition comprising the melt blending product of (a) 3 percent by weight of BLLDPE; and (b) 97 percent by weight of MLLDPE. The properties of the Inventive Composition 1 are measured, and reported in Table 2.

Inventive Composition 2

Inventive Composition 2 is a polyethylene blend-composition comprising the melt blending product of (a) 3 percent by weight of BLLDPE; (b) 94 percent by weight of MLLDPE (including 900 parts of DHT-4A per million parts of the MLLDPE); and (c) 3 percent by weight of LDPE. The properties of the Inventive Composition 2 are measured, and reported in Table 2.

Comparative Composition A

Comparative Composition A is a polyethylene blend-composition comprising 100 percent by weight of MLLDPE. The properties of the Comparative Composition A are measured, and reported in Table 2.

Inventive Films 1

Inventive Compositions 1 is formed into Inventive Film 1 via a blown film process based on the process conditions reported in Table 3. Inventive Film 1, a monolayer film, was tested for its properties, and the results are reported in Table 4. The film properties reported in Table 4 are for films made at maximum rate (approximately 14.9 lb/hr/in or 375 lb/hr).

Inventive Films 2

Inventive Compositions 2 is formed into Inventive Film 2 via a blown film process based on the process conditions reported in Table 3. Inventive Film 2, a monolayer film, was tested for its properties, and the results are reported in Table 4. The film properties reported in Table 4 are for films made at maximum rate (approximately 15.6 lb/hr/in or 392 lb/hr).

Comparative Films A

Comparative Compositions A is formed into Comparative Film A via a blown film process based on the process conditions reported in Table 3. Comparative Film A, a monolayer film, is tested for its properties, and the results are reported in Table 4. The film properties reported in Table 4 are for films made at maximum rate (approximately 13.9 lb/hr/in or 349 lb/hr).

TABLE 1

|  | Units | BLLDPE | MLLDPE | LDPE |
|---|---|---|---|---|
| Density | g/cm³ | 0.961 | 0.920 | 0.919 |
| $I_2$ | g/10 min | 0.83 | 0.96 | 1.85 |
| $I_{10}/I_2$ |  | 10.6 | 7.9 | 14.3 |
| Viscosity (0.1 rad/s) | Pa·s | 17,602 | 8,636 | 8,863 |
| Viscosity (1.0 rad/s) | Pa·s | 8,230 | 7,021 | 4,639 |
| Viscosity (10 rad/s) | Pa·s | 3,746 | 4,260 | 1,658 |
| Viscosity (100 rad/s) | Pa·s | 1347 | 1,677 | 464 |
| Tan Delta (0.1 rad/s) |  | 2.1 | 10.4 | 3.1 |
| Melt Strength | cN | 3.9 | 3.0 | 9.2 |
| $M_n$ | g/mol | 19,470 | 28,750 | 11,628 |
| $M_w$ | g/mol | 101,410 | 115,650 | 94,485 |
| $M_z$ | g/mol | 280,100 | 386,194 | 321,061 |
| $M_w/M_n$ |  | 5.21 | 4.02 | 8.13 |

TABLE 1-continued

|  | Units | BLLDPE | MLLDPE | LDPE |
|---|---|---|---|---|
| $T_{m1}$(DSC) | °C. | 134.4 | 122.3 | 109.2 |
| $T_{m2}$(DSC) | °C. |  | 110.4 |  |
| $T_{c1}$ (DSC) | °C. | 119.1 | 105.0 | 95.6 |
| Heat of fusion | J/g | 217.1 | 140.5 | 136.8 |

TABLE 2

| Polymer Property | Units | Inventive Composition 1 | Inventive Composition 2 | Comparative Composition A |
|---|---|---|---|---|
| Density | g/cm³ | 0.921 | 0.921 | 0.920 |
| $I_2$ | g/10 min | 0.96 | 0.944 | 0.96 |
| $I_{10}/I_2$ |  | 7.9 | 8.0 | 7.9 |
| Viscosity (0.1 rad/s) | Pa·s | 8,624 | 8,911 | 8,636 |
| Viscosity (1.0 rad/s) | Pa·s | 6,968 | 6,995 | 7,021 |
| Viscosity (10 rad/s) | Pa·s | 4,206 | 4,107 | 4,260 |
| Viscosity (100 rad/s) | Pa·s | 1,651 | 1,608 | 1,677 |
| Tan Delta (0.1 rad/s) |  | 10.0 | 8.8 | 10.4 |
| Melt Strength | cN | 3.0 | 4.7 | 3.0 |
| $M_n$ | g/mol | 28,496 | 28,894 | 28,750 |
| $M_w$ | g/mol | 111,230 | 111,494 | 115,650 |
| $M_z$ | g/mol | 325,713 | 302,836 | 386,194 |
| $M_w/M_n$ |  | 3.90 | 3.86 | 4.02 |
| $T_{m1}$(DSC) | °C. | 121.8 | 122.5 | 122.3 |
| $T_{m2}$(DSC) | °C. | 110.1 | 110.4 | 110.4 |
| $T_{c1}$ (DSC) | °C. | 109.7 | 110.7 | 105.0 |
| Heat of fusion | J/g | 141.9 | 146.8 | 140.5 |

TABLE 3

| Film Fabrication | Units | Inventive Film 1 | Inventive Film 2 | Comparative Film A |
|---|---|---|---|---|
| Max Output rate | lbs/hr | 375 | 392 | 349 |
| Max Output rate | lbs/hr/inch | 14.9 | 15.6 | 13.9 |
| Rate improvement over CE-A | % | 7.4 | 12.3 | 0 |
| Screw Speed (RPM) | RPM | 52.9 | 56 | 46.8 |
| Frost Line Height (FLH-inch) | Inch | 68 | 68 | 57 |
| External Air (%) | % | 43.9 | 45.2 | 45.7 |
| IBC Exhaust Air (%) | % | 96 | 96.8 | 97.6 |
| IBC Supply Air (%) | % | 34.9 | 34.9 | 34.9 |
| % Full load current | % | 6.9 | 7.2 | 6.3 |
| Horsepower | HP | 8 | 10 | 5 |
| Barrel P1 (psi) | psi | 3340 | 3200 | 3650 |
| Barrel P2 (psi) | Psi | 3980 | 3840 | 4240 |
| Barrel P3 (psi) | Psi | 4300 | 4330 | 4300 |
| Screen Pressure (psi) | Psi | 4330 | 4310 | 4240 |
| Adapter P (psi) | Psi | 2490 | 2500 | 2400 |
| Melt Temp. | °F. | 453 | 452 | 444 |
| Temp. Profile (°F.) |  |  |  |  |
| Barrel T1 | °F. | 350 | 350 | 350 |
| Barrel T2 | °F. | 425 | 425 | 425 |
| Barrel T3 | °F. | 380 | 380 | 380 |
| Barrel T4 | °F. | 325 | 325 | 325 |
| Barrel T5 | °F. | 345 | 345 | 345 |
| Screen T | °F. | 430 | 430 | 430 |
| Adapter T | °F. | 445 | 445 | 445 |
| Block T | °F. | 430 | 430 | 430 |
| Lower Die T | °F. | 440 | 440 | 440 |
| Inner Die T | °F. | 440 | 440 | 440 |
| Upper Die T | °F. | 440 | 440 | 440 |

TABLE 4

| Film Properties | Units | Inventive Film 1 | Inventive Film 2 | Comparative Film A |
|---|---|---|---|---|
| Film Thickness | mil | 2.0 | 2.0 | 2.0 |
| Dart Impact Resistance-(Method A) | g | 283 | 273 | 424 |
| Tear: Elmendorf-MD | g/mil | 441 | 415 | 452 |
| Tear: Elmendorf-CD | g/mil | 585 | 605 | 514 |
| Puncture | ft*1bf/in$^3$ | 216 | 186 | 321 |
| Total Haze | % | 36.4 | 16.5 | 21.5 |
| Internal Haze | % | 5.4 | 4.1 | 4.5 |
| Gloss | % | 15.8 | 41.4 | 33.6 |
| Secant Modulus-CD(1%) | psi | 46513 | 43005 | 44333 |
| Secant Modulus-MD(1%) | psi | 38847 | 40387 | 38174 |

Test Methods

Test methods include the following:

Melt Index

Melt indices ($I_2$ and $I_{10}$) were measured in accordance to ASTM D-1238 at 190° C. and at 2.16 kg and 10 kg load, respectively. Their values are reported in g/10 min.

Density

Samples for density measurement were prepared according to ASTM D4703. Measurements were made within one hour of sample pressing using ASTM D792, Method B.

Dynamic Shear Rheology

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic viscosity ($\eta^*$), and tan ($\delta$) or tan delta were calculated.

Melt Strength

Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips located 100 mm below the die with an acceleration of 2.4 mm/second$^2$. The tensile force is recorded as a function of the take-up speed of the nip rolls. Melt strength is reported as the plateau force (cN) before the strand broke. The following conditions are used in the melt strength measurements: Plunger speed=0.265 mm/second; wheel acceleration=2.4 mm/s$^2$; capillary diameter=2.0 mm; capillary length=30 mm; and barrel diameter=12 mm.

DSC Crystallinity Determination

Differential Scanning Calorimetry (DSC) can be used to measure the crystallinity of a sample at a given temperature for a wide range of temperatures. For the Examples, a TA model Q1000 DSC (TA Instruments; New Castle, Del.) equipped with an RCS (Refrigerated Cooling System) cooling accessory and an autosampler module is used to perform the tests. During testing, a nitrogen purge gas flow of 50 ml/minute is used. Each sample is pressed into a thin film and melted in the press at about 175° C.; the melted sample is then air-cooled to room temperature (~25° C.). A 3-10 mg sample of the cooled material is cut into a 6 mm diameter disk, weighed, placed in a light aluminum pan (ca 50 mg), and crimped shut. The sample is then tested for its thermal behavior.

The thermal behavior of the sample is determined by changing the sample temperature upwards and downwards to create a response versus temperature profile. The sample is first rapidly heated to 180° C. and held at an isothermal state for 3 minutes in order to remove any previous thermal history. Next, the sample is then cooled to –40° C. at a 10° C./minute cooling rate and held at –40° C. for 3 minutes. The sample is then heated to 150° C. at 10° C./minute heating rate. The cooling and second heating curves are recorded. The values determined are peak melting temperature ($T_m$), peak crystallization temperature ($T_c$), the heat of fusion ($H_f$), and the % crystallinity for polyethylene samples calculated using Equation 1:

$$\% \text{ Crystallinity}=[(H_f(J/g))/(292\ J/g)] \times 100 \qquad (Eq.\ 1)$$

The heat of fusion ($H_f$) and the peak melting temperature are reported from the second heat curve. The peak crystallization temperature is determined from the cooling curve.

High Temperature Gel Permeation Chromatography

The Gel Permeation Chromatography (GPC) system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using Equation 2 (as described in Williams and Ward, *J. Polym. Sci.*, Polym. Letters, 6, 621 (1968)):

$$M_{polyethylene}=A\times(M_{polystyrene})^B \quad\text{(Eq. 2)},$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

$^{13}$C NMR

The samples were prepared by adding approximately 2.7 g of a 50/50 mixture of tetrachloroethane-$d_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat LDPE.

Film Testing Conditions

The following physical properties are measured on the films produced:

Total and Internal Haze: Samples measured for internal haze and overall haze are sampled and prepared according to ASTM D 1746. Internal haze was obtained via refractive index matching using mineral oil on both sides of the films. A Hazegard Plus (BYK-Gardner USA; Columbia, Md.) is used for testing.

45° Gloss: ASTM D-2457.

1% Secant Modulus-MD (machine direction) and CD (cross direction): ASTM D-882.

MD and CD Elmendorf Tear Strength: ASTM D-1922

MD and CD Tensile Strength: ASTM D-882

Dart Impact Strength: ASTM D-1709, Method A

Puncture Strength: Puncture strength is measured on a Instron Model 4201 with Sintech Testworks Software Version 3.10. The specimen size is 6"×6" and 4 measurements are made to determine an average puncture value. The film is conditioned for 40 hours after film production and at least 24 hours in an ASTM controlled laboratory. A 100 lb load cell is used with a round specimen holder 12.56" square. The puncture probe is a ½" diameter polished stainless steel ball with a 7.5" maximum travel length. There is no gauge length; the probe is as close as possible to, but not touching, the specimen. The crosshead speed used is 10"/minute. The thickness is measured in the middle of the specimen. The thickness of the film, the distance the crosshead traveled, and the peak load are used to determine the puncture by the software. The puncture probe is cleaned using a "Kimwipe" after each specimen.

Determination of Maximum Output Rate of Blown Film

Film samples are collected at a controlled rate and at a maximum rate. The controlled rate is 250 lb/hr which equals an output rate of 10 lb/hr/inch of die circumference. Note the die diameter used for the maximum output trials is an 8" die so that for the controlled rate, as an example, the conversion between lb/hr and lb/hr/inch of die circumference is shown in Equation 3. Similarly, such an equation can be used for other rates, such as the maximum rate, by substituting the maximum rate in Equation 3 for the standard rate of 250 lb/hr to determine the lb/hr/inch of die circumference.

$$\text{Lb/Hr/Inch of Die Circumference}=(250\text{ Lb/Hr})/(8*\pi)=10 \quad\text{(Eq. 3)}$$

The maximum rate for a given sample is determined by increasing the output rate to the point where bubble stability is the limiting factor. The extruder profile is maintained for both samples (standard rate and maximum rate), however the melt temperature is higher for the maximum rate samples due to the increased shear rate. The maximum rate is determined by maximizing both the internal bubble cooling and the external cooling via the air ring. The maximum bubble stability is determined by taking the bubble to the point where any one of the following things was observed (a) the bubble would not stay seated in the air ring (b) the bubble started to lose its shape (c) the bubble started to breathe in and out or (d) the frost line height would become unstable. At that point the rate is reduced to where the bubble is reseated in the air ring while maintaining the shape of the bubble and a steady frost line height and then a sample is collected. The cooling on the bubble is adjusted by adjusting the air ring and maintaining the bubble. This is taken as the maximum output rate while maintaining bubble stability.

Monolayer films were produced. The die diameter is 8 inches, the die gap is 70 mils, the blow up ratio is 2.5, and internal bubble cooling is used.

The present invention may be embodied in other forms without departing from the spirit and the essential attributes thereof, and, accordingly, reference should be made to the appended claims, rather than to the foregoing specification, as indicating the scope of the invention.

We claim:

1. A polyethylene blend-composition suitable for blown film comprising the melt blending product of:
   from 0.5 to 6 percent by weight of a bimodal linear low density polyethylene having a density in the range of from 0.935 to 0.970 g/cm$^3$, and a melt index ($I_2$) in the range of from 0.3 to 5 g/10 minutes;

90 percent or greater by weight of a monomodal linear low density polyethylene having a density in the range of from 0.910 to 0.950 g/cm$^3$, and a melt index ($I_2$) in the range of from 0.1 to less than or equal to 5 g/10 minutes;

optionally from 0.5 to 4 percent by weight of a low density polyethylene having a density in the range of from 0.915 to 0.935 g/cm$^3$, and a melt index ($I_2$) in the range of from greater than 0.8 to less than or equal to 5 g/10 minutes, and a molecular weight distribution ($M_w/M_n$) in the range of from 6 to 10;

optionally a hydrotalcite based neutralizing agent;
   optionally one or more nucleating agents;
   and optionally one or more antioxidants.

2. The polyethylene blend composition of claim 1, wherein when said polyethylene blend-composition is formed into a film via blown film process, the output rate is improved at least 5 percent relative to a similar linear low density polyethylene.

3. A blown film comprising the polyethylene blend-composition of claim 1.

4. An article comprising one or more blown films comprising the polyethylene blend-composition of claim 1.

5. A container device comprising:
   a. one or more substrates; and
   b. one or more layers comprising one or more blown films comprising the polyethylene blend-composition of claim 1.

6. The composition of claim 1, wherein the polyethylene blend composition has a peak at 32.7 ppm measured via $^{13}$C NMR, indicating the presence of $C_3$ carbon of $C_5$ branch in the LDPE component.

* * * * *